United States Patent

Bernasson et al.

[11] Patent Number: 5,737,472
[45] Date of Patent: Apr. 7, 1998

[54] OPTICAL FIBER WITH MULTIPLE POINT LATERAL ILLUMINATION

[75] Inventors: André Bernasson, Les Pradeaux; Hubert Peuvergne, Champdieu, both of France

[73] Assignee: Audio-Images S.A.R.L., Menetrol, France

[21] Appl. No.: 695,075

[22] Filed: Jun. 17, 1996

Related U.S. Application Data

[63] Continuation-in-part of PCT/FR94/01475, Dec. 16, 1994.

[30] Foreign Application Priority Data

Dec. 17, 1993 [FR] France ..................... 9315401
Dec. 16, 1994 [WO] WIPO ............... PCT/FR94/01475

[51] Int. Cl.$^6$ ........................................ G02B 6/02
[52] U.S. Cl. ................ 385/123; 385/12; 385/901; 385/128
[58] Field of Search ............... 385/123, 12, 13, 385/127, 901, 128

[56] References Cited

U.S. PATENT DOCUMENTS

| | | | |
|---|---|---|---|
| 4,466,697 | 8/1984 | Daniel | 385/123 |
| 5,042,892 | 8/1991 | Chiu et al. | 385/114 |
| 5,222,795 | 6/1993 | Hed | 362/32 |
| 5,579,429 | 11/1996 | Naum | 385/143 |

FOREIGN PATENT DOCUMENTS

| | | |
|---|---|---|
| 3600635 | 7/1987 | Germany . |
| 3908687 | 9/1990 | Germany . |

*Primary Examiner*—Phan T. H. Palmer
*Attorney, Agent, or Firm*—Horst M. Kasper

[57] ABSTRACT

An optical fiber of cylindrical construction provides a lateral light outflow. The optical fiber, which is adapted to convey a light flow from one of its ends, the inlet end (6), to the other end, the outlet end (8), comprises at least on a given area (2) of its outer surface a large number of closely spaced degradations (4) of very small size in relation to the fiber diameter, each of said degradations (4) causing the outflow of conveyed light through the point so that the fiber seems globally illuminated. The surface density of the degradations (4) varies in accordance with the direction of propagation of the light flow, which is thus substantially uniformly discharged over the entire length of the fiber.

10 Claims, 3 Drawing Sheets

OPTICAL FIBER WITH MULTIPLE POINT LATERAL ILLUMINATION

CROSS-REFERENCE TO RELATED APPLICATIONS

This application is a continuation-in-part application of another international application filed under the Patent Cooperation Treaty on Dec. 16, 1994, bearing Application No PCT/FR94/01475, and listing the United States as a designated and/or elected country. The entire disclosure of this latter application, including the drawings thereof, is hereby incorporated in this application as if set forth herein.

BACKGROUND OF THE INVENTION

1. Field of the Invention

The present invention relates to the field of fiber optics and, in particular, it has the purpose to provide a fiber-optical structure furnishing a lateral emergence of the light, as well as methods for obtaining such a structure. One understands under light, in the following description, any visible or non-visible magnetic radiation susceptible to be conveyed in a refractive medium.

2. Brief Description of the Background of the Invention Including Prior Art

It is noted that an optical fiber, which is a waveguide for the light, is formed of a translucent medium which extends in one direction (the fiber direction) and which is covered on the outside with a covering of another translucent medium with a different refractive index. It is known that the smallest point of rupture of the external covering causing its partial destruction, called a degradation, is the seat of a light emergence when a light flux is present in the fiber.

Different techniques are known which are aimed to make the light, conveyed by an optical fiber, emerge on the side on short distances, which consist in altering the outer surface of the fiber. Thus, the U.S. Pat. No. 5,222,795 (HED) and the U.S. Pat. No. 5,042,892 (CHIU) propose to provide for notches on the covering of the optical fiber while the German Patent document 3,908,697 (HUFFERT) proposes to cover the core of the fiber with a layer of transparent glue in order to bring about cracks on its covering, and the German Patent document 3,600,635 (HELMUT) proposes to provide transverse grooves on the outer surface of the optical fiber by sandblasting.

SUMMARY OF THE INVENTION

1. Purposes of the Invention

The object of the present invention is to disclose a treatment of an optical fiber, in particular of a large length, i.e. of the order of several meters, and a structure of an optical fiber thus treated, which confer to the fiber an appearance of uniformity or a quasi continuous luminosity, with a relation between the flux flowing out on the side and the entering flux of close to 100%, be it all along the fiber, be it only along certain parts of the fiber, be it, more importantly, all along or along a part of a bundle composed of a plurality of fibers.

These and other objects and advantages of the present invention will become evident from the description which follows.

2. Brief Description of the Invention

According to the present invention, an optical fiber, i.e. a fiber constructed to convey a flux of light from one light source disposed at one of its ends, called inlet end, toward another end, called outlet end, said fiber having a substantially cylindrical shape and comprising on at least one area, called treated area, of its outer surface numerous degradations which are closely spaced of very small dimensions with respect to the diameter of the fiber from a shaped point source of the light conveyed in the fiber.

Degradations where the surface density $D(x)$, i.e. their number per unit of surface, in a unitary elementary surface $\delta s$ varies according to the direction of propagation of the light flux are characterized in its generality in that said degradations, having a dimension between 10-3 and 10-1 times the diameter of the fiber for a fiber having a diameter between 0.5 and 3 mm and a depth equivalent to their diameter, are configured into more or less elongated craters, i.e. of a length between 1 and 5 times their width, where each degradation causes an appearance of uniformity of the light conveyed in the fiber, its superficial density varying according to the propagation direction of the light flux according to a law of progression such that at a point i the density of the light flux $D_i$ in this point be inversely proportional to the light flux $\phi_i$ in this point, i.e. $D_i = K * 1/\phi_i$, where it results that the light flux emerges substantially constant and uniform over the length of the said area. Preferably, the density $D(x)$ of the degradations is moreover such that the internal light flux at the outlet end of the fiber is negligible, i.e. less than 15% of the light flux introduced into the fiber.

It is to be understood that the dimensions of said degradations are given by way of example only and that they can be transposed by a person skilled in the art as a function of the diameter of the fiber and of the material constituting the fiber.

According to a simplified form of an embodiment, the fiber includes between its inlet end and its outlet end only one single area of degradations, where the density $D(x)$ of the degradations is such that the light flux is constantly and uniformly emerging over the entire area. Alternatively, the fiber could comprise several treated areas separated by non-treated areas. The fibers of the invention can be grouped into a bundle, with the treated areas adjacent, which reinforces the effect of continuity of the luminosity.

In a variant, called a fiber having a double inlet, according to which a fiber is fed with light by its two ends, the density of the degradations progresses from one end to a maximum value and then decreases in the direction to the other ends One notes that if the negligible character of the exiting flux is a recognition criterion of certain fibers relevant to the invention, it is however not an absolute criterion since other fibers of relevance do not satisfy this criterion. Thus, the double-inlet fiber; thus also a section of fiber or its equivalent such as originally obtained; thus also a fiber of the invention of which one would have desired that it provides a residual flux at the outlet end.

According to a first kind of method for obtaining the invention fiber, where the constituting material can be inorganic (glasses, silicon, for example) as well as organic (plastic material), the operation of forming the degradations, which can be understood to be the equivalent of a frosting, can be an abrasive operation (mechanical), for example a sandblasting operation with a powder of a hardness which is appropriate for the hardness of the material such as sifted aluminate with square-mesh screen of 0.2 mm or also corundum, quartz, etc.).

According to a second kind of method for obtaining a fiber according to the invention, the material of the fiber, and in particular that of its outer cover, being susceptible to chemical attack, the frosting can result of an atomization of a solvent in the form of an aerosol which modifies the structure of the outer cover of the fibers.

The aforementioned methods are applied both to a fiber itself having a substantially cylindrical form and to a fiber having a polygonal cross-section, and they are also applicable to a fabric, where the threads of the fabric, for example weft yarns, are optical fibers by noting that the sandblasting is advantageously performed on the fabric itself, rather than on the fibers prior to weaving.

If a fiber with a rectangular cross-section is present, the treatment can be applied to only one of the surfaces in order to group the light emergences onto this one surface.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

In the accompanying drawings, in which are shown several of the various possible embodiments of the present invention.

DESCRIPTION OF INVENTION AND PREFERRED EMBODIMENT

Figure 1:
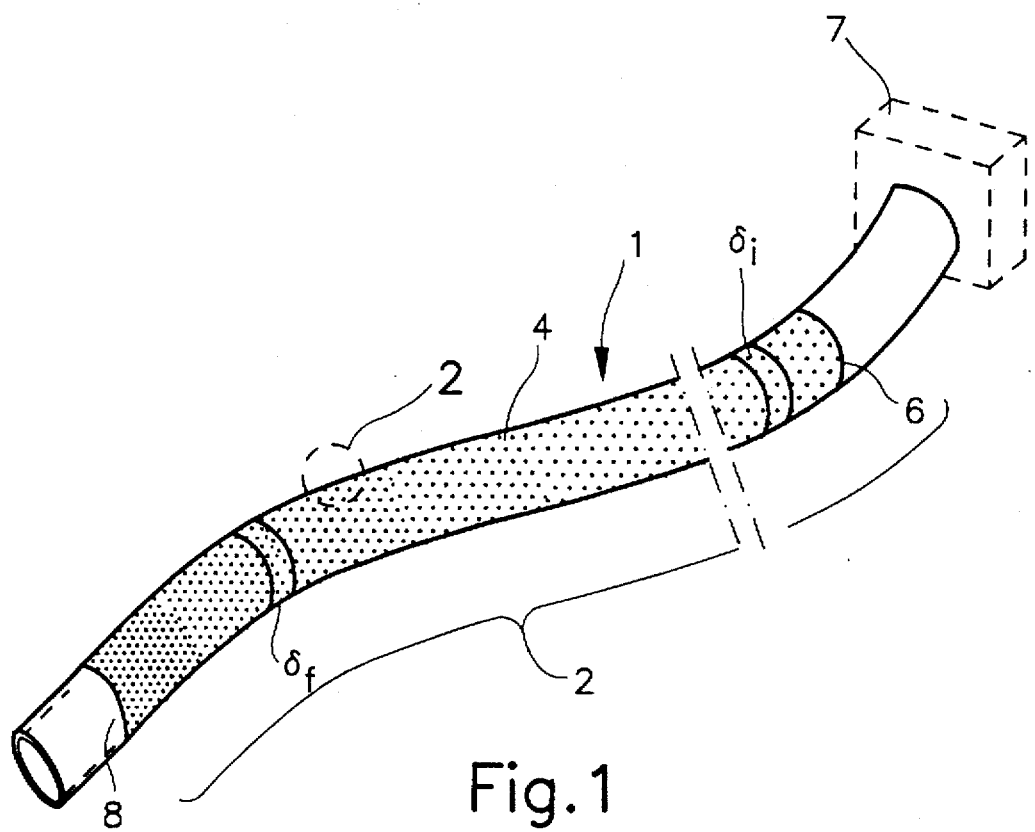
FIG. 1 illustrates a part of a fiber according to the invention.

According to FIG. 1, an optical fiber 1, constituting a particular form of the structure of the present invention, includes degradations 4 in a given area 2 of its surface of its outer cover, wherein the density of the degradations increases from one inlet end 6, intended to be close to a light source 7, up to an outlet end 8. Thus, the degradations are much more numerous (see Table) in the elementary surface δf than in the elementary surface δi closer to the light source.

By way example and in order to put forward the variation of the number of degradations per unit of surface (the surface density), the case of an embodiment is given by the following table which furnishes for each of the ten successive parts of one area the number of degradations of each part to obtaining a substantially uniform and constant emerging luminosity along the area.

Table 100 111 125 142 166 200 250 333 500 1000

Figure 2:
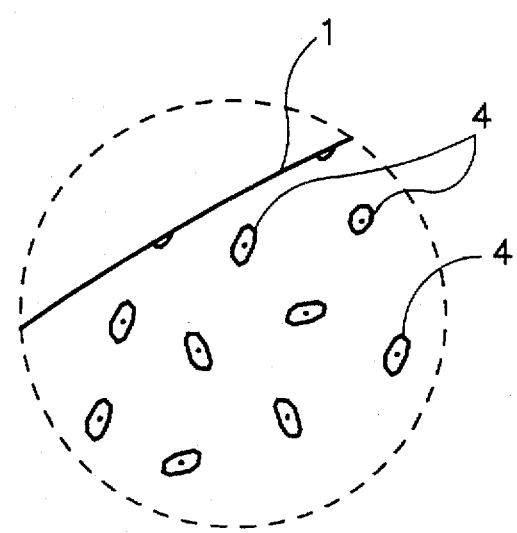
FIG. 2 is an enlarged detail of the preceding figure.

It appears on FIG. 2 that the degradations 4 of the fiber, which are obtained by sandblasting, that said degradations have therefore the form of more or less elongated craters, i.e. of a length between 1 and 5 times their width.

Figure 3:
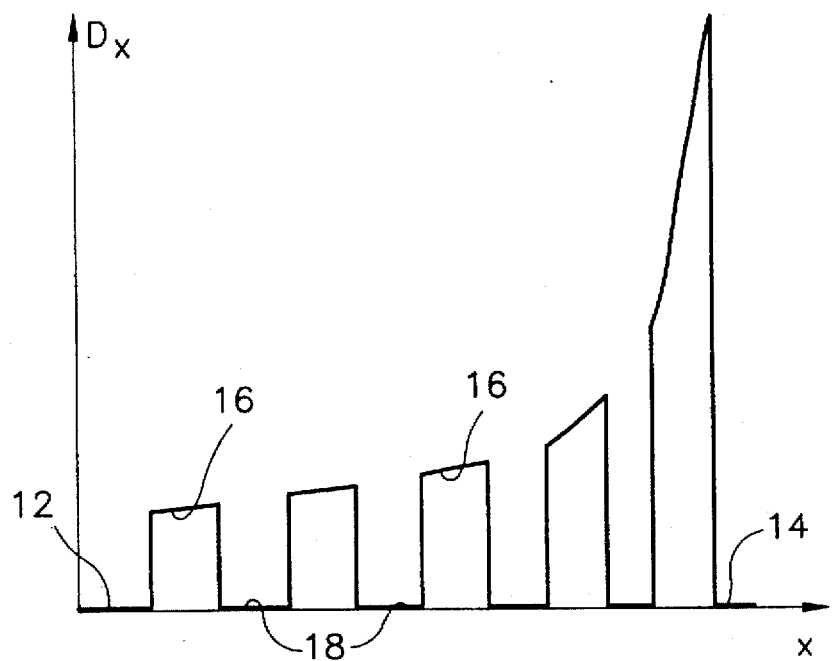
FIG. 3 is a diagram illustrating a form of distribution of the degradations of a fiber of the invention.

The diagram of FIG. 3 shows the variation of the density Dx of a fiber from an inlet end 12 up to an outlet end 14, wherein the luminescent areas 16 are alternating with dark areas 18. This figure informs in addition about the course or rate of the progression of the density of the degradation.

Figure 4:
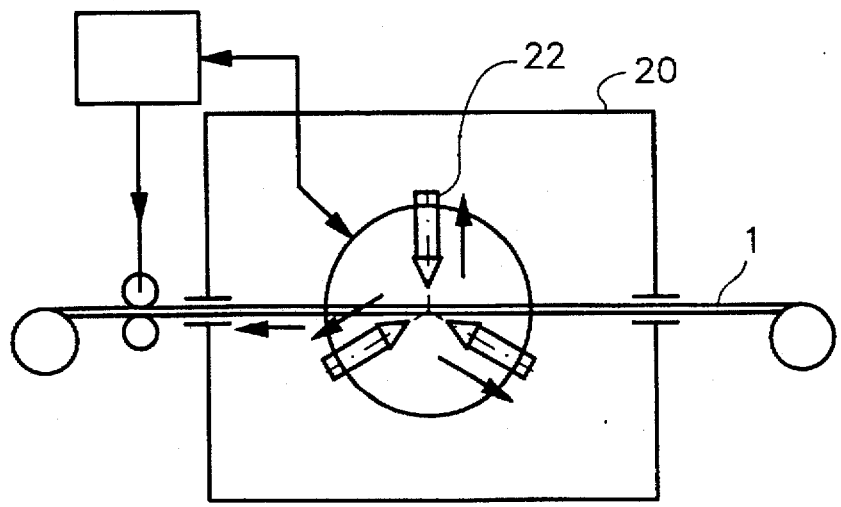
FIG. 4 is a schematic diagram illustrating a first method for obtaining a fiber according to the invention.

The method of FIG. 4 comprises to make the optical fiber 1 run off or unwind at a constant speed in a sandblasting cabin 20 facing at least one nozzle such as 22, wherein the feeding of the nozzle is constant, both with respect to the quantity of abrasive as well as to the pressure of the compressed air, but where the distance to the fiber changes as a function of the unwinding of the fiber. One notes that the treatment to which a single fiber is subjected, such as shown in FIG. 4, can just as well be applied to a plurality of fibers which are disposed side by side or disposed or linked in another manner, for example, twisted, braided, or woven.

By way of example, for a fiber made of polymethacrylate methyl of a length of two meters and of a diameter of 1 mm, for example, the process of FIG. 4 consists in having the fiber unwind at 0.1l/s in front of a nozzle of 8 mm, where the feeding of abrasive quantity is uniform, in particular alumina grains of dimensions of less than 0.2 mm, and at a compressed air pressure of 4 bars, but where the distance to the fiber varies as a function of the unwinding of the fibers between 35 cm at the beginning of the treatment up to 3 cm at the end of the treatment.

Figure 5:
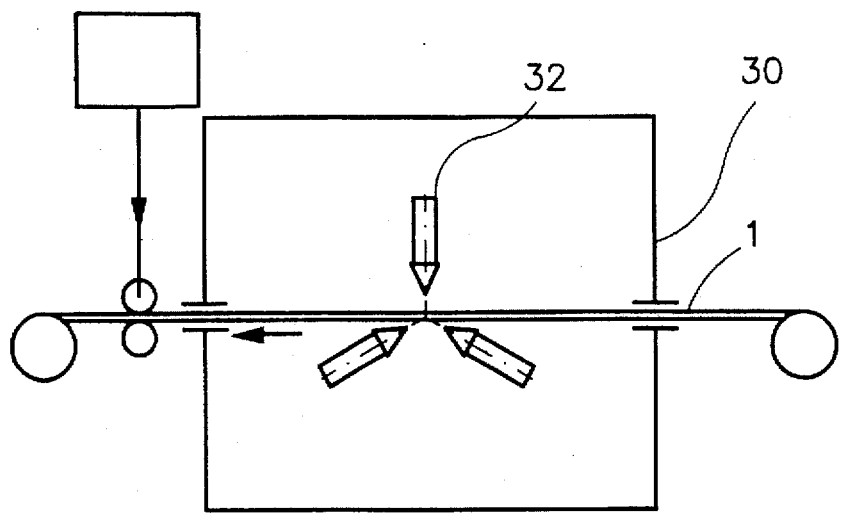
FIG. 5 is a schematic diagram illustrating a second method for obtaining a fiber according to the invention.

Nevertheless, the method of FIG. 4 is only a mode of production of the fiber of the invention given by way of example; thus, the person skilled in the art could also apply the method of FIG. 5 from the above-cited data and from the known prior art, which method comprises to make the optical fiber 1 unwind at a variable speed in a sandblasting cabin 30 facing at least one nozzle such as 32, wherein the feeding is constant, both with respect to quantity of abrasive as well as with respect to the pressure of the compressed air. In any case, the variation of the density of the degradations can be controlled by the speed of the unwinding of the fiber or by the separation distance of the nozzle, or by the pressure of compressed air, or by the quantity of abrasive, as well as by the combination of these factors.

The methods which were just described are derived from an "a priori" determination of the various cinematic embodiments (speed of removal and separation of the nozzles, speed of the fiber, acceleration of the fiber). This determination is corrected in the following as a function of the obtained results and of the ones which are attained according to the particular forms of realization of the invention desired by the person skilled in the art, from his knowledge of the field of the invention which has just been described. It is thus understood that the person in the art can, from the given examples and from the known prior art, apply the methods of the invention to any other optical fiber, and adjust the different parameters, which have been given by way of example as a function of the desired specific results, both in regard to the size and to the density of the degradations, from the general rule given above.

Figure 6:
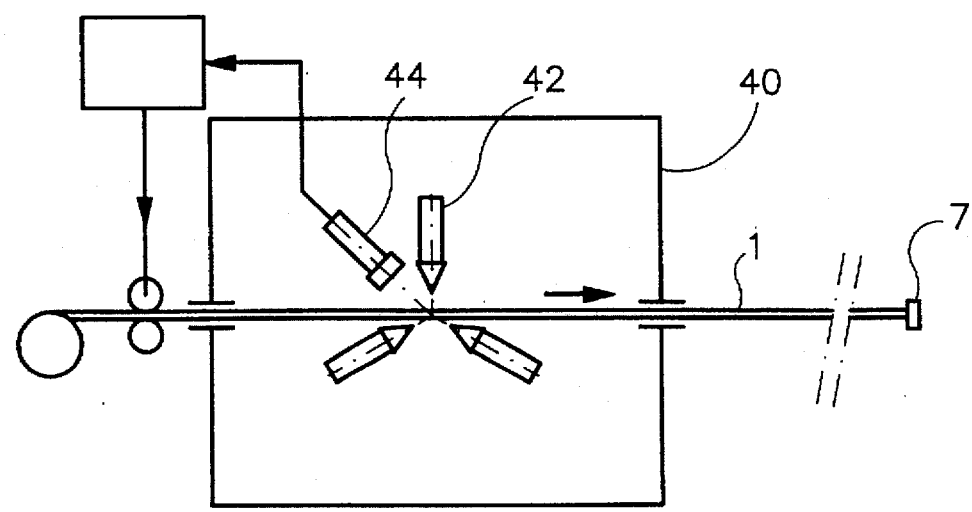
FIG. 6 is a schematic diagram illustrating a third method for obtaining a fiber according to the present invention.

The method of FIG. 6 comprises to have the optical fiber 1 maintained under an input of a continuous light flux by a light source 7 in a sandblasting cabin 40 facing at least one nozzle such as 42 fixed, wherein the feeding of the nozzle is constant, both with respect to the quantity of abrasive as wall as to the pressure of the compressed air. In this method, the unwinding of the fiber is dependent on a photoelectric cell 44, placed facing the area of the fiber where the sandblasting is effected, wherein the cell only controls and/or actuates the unwinding of the fiber when the light, perceived by the cell, has reached the desired intensity. This latter method has the advantage of greatly simplifying the approach "a priori" of the preceding methods by a meticulous control of the results received quasi simultaneously at their receipt.

One or the other of the methods described above allow to treat only a single side of the fiber, whether this fiber has a circular cross-section or a polygonal cross-section, while preserving the same distribution results of the light flux.

The present invention finds applications in the lighting field, for example, the lighting of information boards, the safety or antideflagration lighting, the lighting of museum objects, etc., in the decoration field, in the signaling field, and in the navigation field, in fanciful apparel and in safety clothing, in furnishings, in the animation of auditoriums and theaters, of show cases and windows, of ice skating rinks, wherein this enumeration is by no means limiting.

Furthermore, the fiber being reversible, i.e. if one lights the surface of the fiber one catches the light flux primarily at the inlet end, one can utilize it as a light receiver or as an antenna for the emission or the reception of infrared light.

As this has been well specified above, the scope of the invention is not limited to optical fibers or bundles of fibers only, but it extends also to films as well as to fabrics incorporating optical fibers.

It will be understood that each of the elements described above, or two or more together, may also find a useful application in other types of optical fibers differing from the types described above.

While the invention has been illustrated and described as embodied in the context of an optical fiber with multiple point lateral illumination, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. Optical fiber, wherein a fiber is furnished to convey a light flux from one light source, disposed at one of its ends, called inlet end, up to another end, called outlet end, said fiber having a substantially cylindrical form and including at least on one certain area (2) of its external surface numerous degradations, closely spaced by small dimensions for the emergence of the light flux in the fiber, where the surface density $D(x)$ of the degradations varies in accordance with the direction of propagation of the light flux, characterized in that said degradations (4) are formed as craters having dimensions between $10^{-3}$ and $10^{-1}$ times the diameter of the fiber, wherein said craters are more or less elongated and have a length varying between 1 and 5 times their width, wherein each degradation causes an appearance of uniformity of the light conveyed in the fiber, wherein the surface density $D(x)$ of the degradations varies, in accordance with the direction of propagation of the light flux, according to a law of progression such that at a point i the density Di at this point be inversely proportional to the light flux $\phi i$ at this point, wherein $Di=K.1/\phi i$.

2. The optical fiber according to claim 1, characterized in that the degradations are obtained by sandblasting, wherein the optical fiber (1) unwinds in a sandblasting chamber (30) in front of at least one projection nozzle (32).

3. The optical fiber according to claim 2, characterized in that it is applied to a plurality of fibers disposed side by side, linked, twisted, braided or woven.

4. The optical fiber according to claim 1, characterized in that said degradations are obtained by attack of a solvent in the form of an aerosol.

5. The optical fiber according to claim 4, characterized in that it is applied to a plurality of fibers disposed side by side, linked, twisted, braided or woven.

6. The optical fiber according to claim 1, characterized in that it includes between its inlet end and its outlet end only one single area of degradations, where the density $D(x)$ of the degradations is such that the emerging light flux is uniform over the entire area.

7. The optical fiber according to claim 1, characterized in that the optical fiber includes several treated areas separated from the non-treated areas.

8. The optical fiber according to claim 1, characterized in that the density $D(x)$ of the degradations is moreover such that the internal light flux at the outlet end of the fiber is negligible.

9. An optical fiber wherein a fiber is furnished to convey a light flux from one light source, disposed at one of its ends, called inlet end, up to another end, called outlet end, said fiber having a substantially cylindrical form and including at least on one certain area (2) of its external surface numerous degradations, closely spaced by small dimensions for the emergence of the light flux in the fiber, where the surface density $D(x)$ of the degradations varies in accordance with the direction of propagation of the light flux, characterized in that said degradations (4) are formed as craters having dimensions between $10^{-3}$ and $10^{-1}$ times the diameter of the fiber, wherein said craters are more or less elongated and have a length varying between 1 and 5 times their width, wherein each degradation causes an appearance of uniformity of the light conveyed in the fiber, wherein the surface density $D(x)$ of the degradations varies, in accordance with the direction of propagation of the light flux, according to a law of progression such that at a point i the density Di at this point be inversely proportional to the light flux $\phi i$ at this point, wherein $Di=K.1/\phi i$;

in that the degradations are obtained by sandblasting, wherein the optical fiber (1) unwinds in a sandblasting chamber (30) in front of at least one projection nozzle (32); and in that said density variation of the degradations is obtained by a variation of any one of at least the factors of the group of factors including the unwinding speed of the fiber, the acceleration of the fiber, the distance of the nozzle from the fiber, the speed of the removal and separation of the nozzle, the pressure of the compressed air for the ejection of the abrasive, and the quantity of the abrasive.

10. The optical fiber according to claim 9, characterized in that the optical fiber is maintained under an input of a continuous light flux by a light source (7, wherein the unwinding of the fiber occurs dependent on a photo-electric cell (44), placed facing the area of the fiber where the sandblasting takes place.

* * * * *

UNITED STATES PATENT AND TRADEMARK OFFICE
CERTIFICATE OF CORRECTION

PATENT NO.  : 5,737,472
DATED       : April 7, 1998
INVENTOR(S) : Bernasson, et al It is certified that error appears in the above-identified patent and that said Letters Patent is hereby corrected as shown below:

Column 3, lines 28, delete "detail of the preceding figure" and insert -- view of the partial view 2 of Fig. 1 --

Signed and Sealed this

Ninth Day of February, 1999

Attest:

*Acting Commissioner of Patents and Trademarks*

*Attesting Officer*